(12) United States Patent
Kobayashi et al.

(10) Patent No.: US 7,089,249 B2
(45) Date of Patent: Aug. 8, 2006

(54) METHOD AND SYSTEM FOR MANAGING DATABASE HAVING A CAPABILITY OF PASSING DATA, AND MEDIUM RELEVANT THERETO

(75) Inventors: Susumu Kobayashi, Kawasaki (JP); Youichi Yamamoto, Machida (JP); Yoshito Kamegi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/864,637

(22) Filed: Jun. 10, 2004

(65) Prior Publication Data

US 2004/0267757 A1    Dec. 30, 2004

Related U.S. Application Data

(63) Continuation of application No. 09/317,434, filed on May 24, 1999, now abandoned.

(30) Foreign Application Priority Data

May 28, 1998 (JP) .................................. 10-147262

(51) Int. Cl.
*G06F 17/30* (2006.01)
(52) U.S. Cl. ........................... 707/10; 707/1; 709/203
(58) Field of Classification Search .............. 707/1–10; 709/203
See application file for complete search history.

(56) References Cited

U.S. PATENT DOCUMENTS

| | | | |
|---|---|---|---|
| 5,408,662 A | 4/1995 | Katsurabayashi | 709/101 |
| 5,742,810 A | 4/1998 | Ng et al. | 707/4 |
| 5,805,846 A * | 9/1998 | Nakajima et al. | 715/753 |
| 5,873,086 A | 2/1999 | Fujii et al. | 707/10 |
| 5,920,870 A | 7/1999 | Briscoe et al. | 707/103 R |
| 5,930,772 A | 7/1999 | Gomyo et al. | |
| 5,983,213 A | 11/1999 | Nakano et al. | 707/1 |
| 6,076,085 A | 6/2000 | Iwata et al. | 707/3 |
| 6,078,920 A | 6/2000 | Tan et al. | 707/10 |
| 6,105,017 A | 8/2000 | Kleewein et al. | 707/10 |
| 6,192,370 B1 | 2/2001 | Primsch | 707/103 |
| 6,336,115 B1 * | 1/2002 | Tominaga et al. | 707/10 |
| 6,412,078 B1 * | 6/2002 | Murotani et al. | 714/9 |
| 6,738,790 B1 * | 5/2004 | Klein et al. | 707/203 |

FOREIGN PATENT DOCUMENTS

| | | |
|---|---|---|
| JP | 6214843 | 8/1994 |
| JP | 408115361 A * | 5/1996 |
| JP | 9223050 | 8/1997 |

OTHER PUBLICATIONS

Hongjun Lu, et al. Dynamic amd Load-Balanced Task-Oriented Database Query Processing in Parallel Systems, IEEE, pp. 357-372.

(Continued)

*Primary Examiner*—Debbie M. Le
(74) *Attorney, Agent, or Firm*—Mattingly, Stanger, Malur & Brundidge, P.C.

(57) ABSTRACT

In a database system of a client-server arrangement, a database server operating in a server outputs data to a storage device. Here, the data stores in a database that is requested by a user application operating in a client. The user application refers to the storage device to which the data is outputted, to obtain the data. Thereby, the data managed by the database server is passed to an application at high speed in the database system.

12 Claims, 14 Drawing Sheets

OTHER PUBLICATIONS

D. Chamberlin, "Using the New DB2 IBM's Object-Relational Database System", Morgan Kaufmann, Publishers, Inc., 1996.

Database Language SQL, ISO Working Draft, Jul. 1996.

M. Stonebraker, "Object-Relational DBMSs", translated by K. Ohta, International Thomas Publishing Japan, Aug. 1996.

* cited by examiner

FIG. 4

```
401
     ┌─────────────────────────────────┐
     │  CREATE TABLE employee (        │─402
     │                                 │
     │  empno      INTEGER ,           │─403
     │                                 │
     │  name       VARCHAR(30) ,       │─404
     │                                 │
     │  dept       VARCHAR(30) ,       │─405
     │                                 │
     │  photo      BLOB(10M)) ;        │─406
     └─────────────────────────────────┘
```

FIG. 5

| empno | name | dept | photo |
|---|---|---|---|
| 1789 | George | design | (blob1) |
| 1797 | John | account | (blob2) |
| 1801 | Thomas | design | (blob3) |
| 1809 | James | general | (blob4) |
| 1829 | Andrew | account | (blob5) |
| 1837 | Martin | planning | (blob6) |

501, 511, 512, 513, 514; rows 521–526

FIG. 6

```
CREATE FUNCTION fileout ( BLOB )         ⟵ 602

RETURNS VARCHAR (255)                    ⟵ 603

EXTERNAL NAME ' bin/fileout              ⟵ 604

LANGUAGE C ;                             ⟵ 605
```

```
801
    EXEC SQL BEGIN DECLARE SECTION        802
        VARCHAR (255) photoFilename ;      803
        VARCHAR (30) empName ;             804
    EXEC SQL END DECLARE SECTION ;         805

EXEC SQL DECLARE curs1 CURSOR FOR      806
        SELECT name, fileout (photo)       807
        FROM employee                      808
        WHERE dept = 'design' ;            809

EXEC SQL OPEN curs1 ;                  810 while (1) {                            811
        EXEC SQL FETCH curs1 INTO : empName, photoFilename ;   812 if (SQLCODE == 100) break ;  /* no more data  */       813 setImageDataToList (empName, photoFilename) ;          814
    }                                                          815

EXEC SQL CLOSE curs1 ;                 816 displayImageDataList ( ) ;             817
```

FIG. 9

| | 911 | 912 |
|---|---|---|
| 901 | George | dbsvexfile1 | 921
| | Thomas | dbsvexfile2 | 922

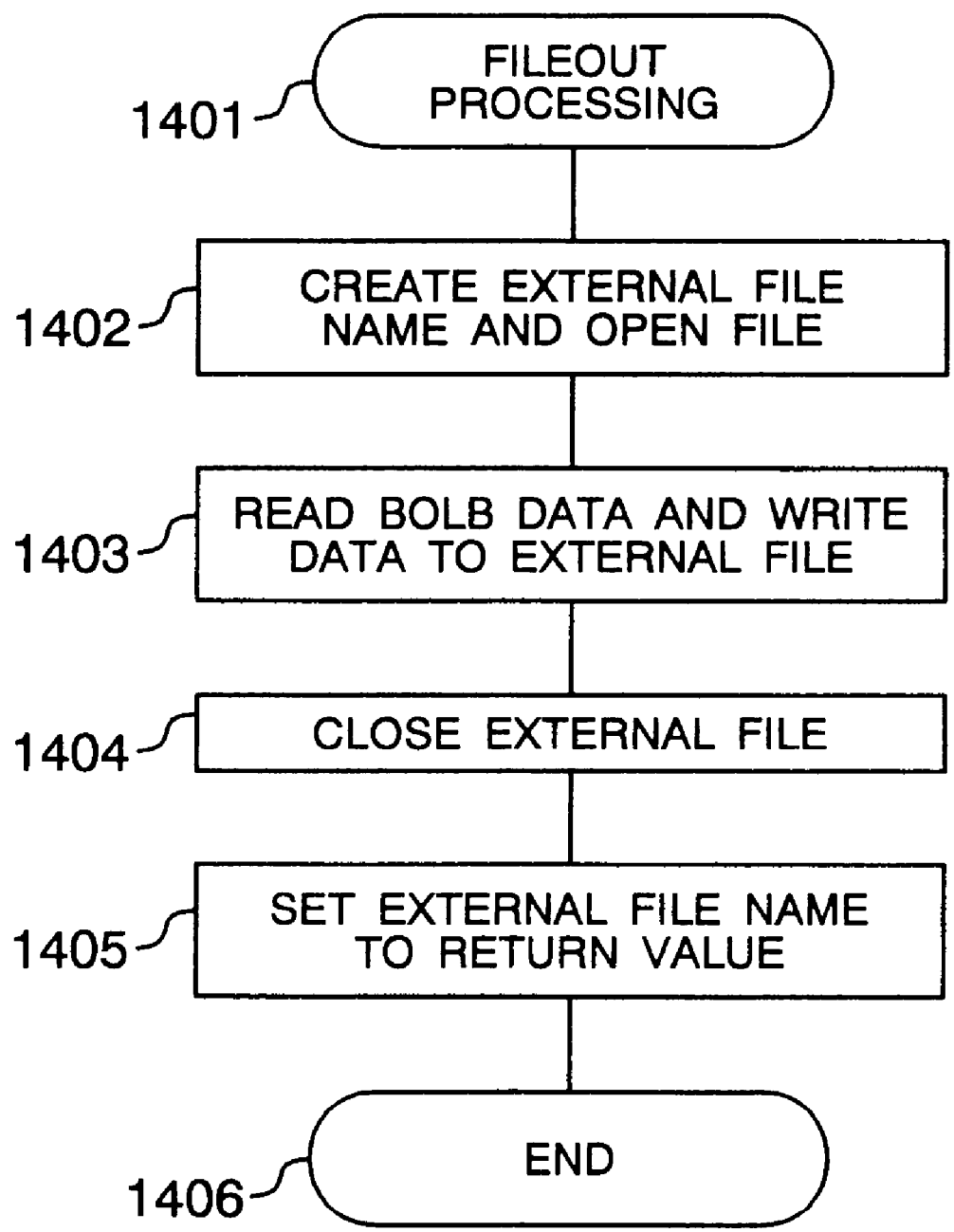

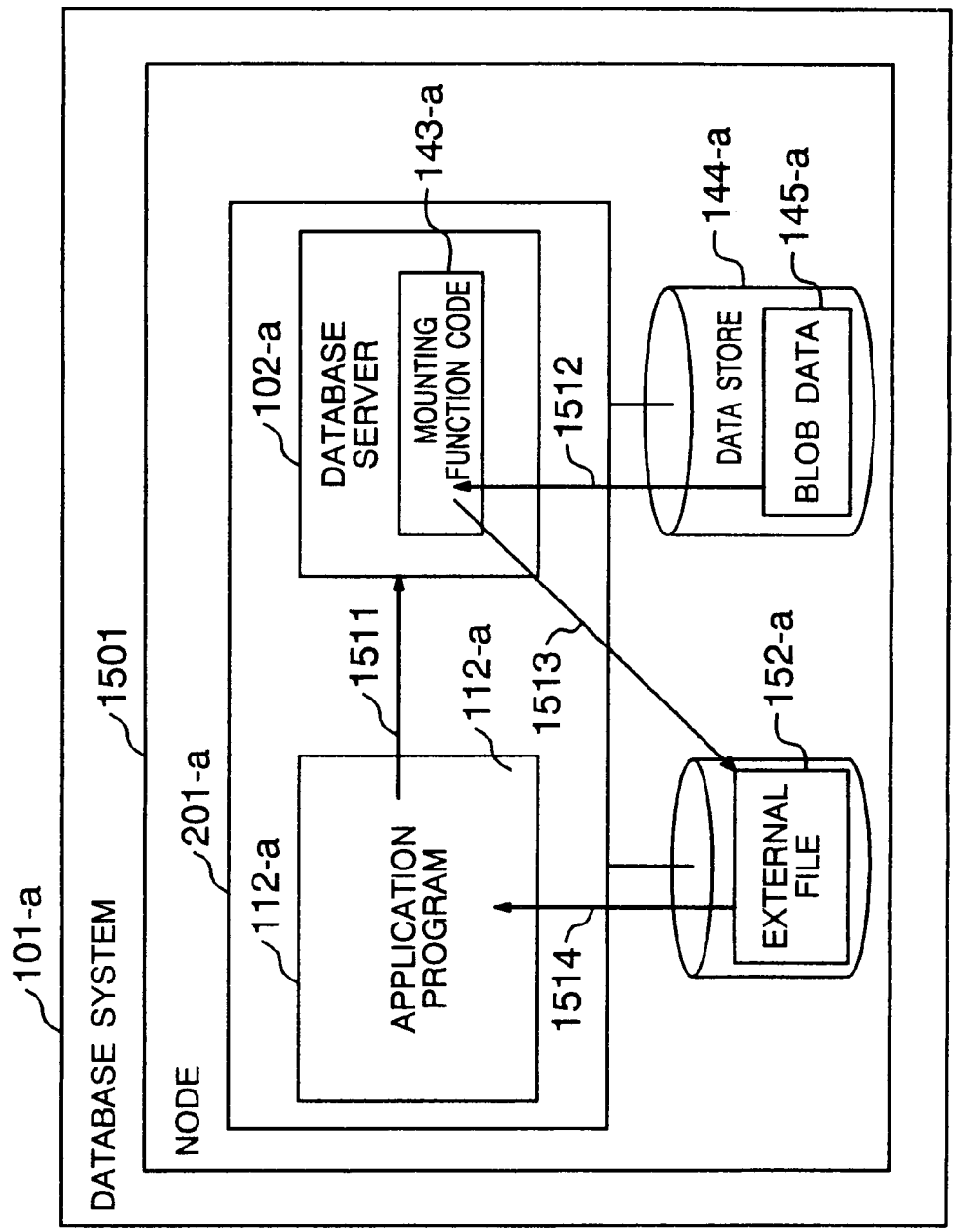

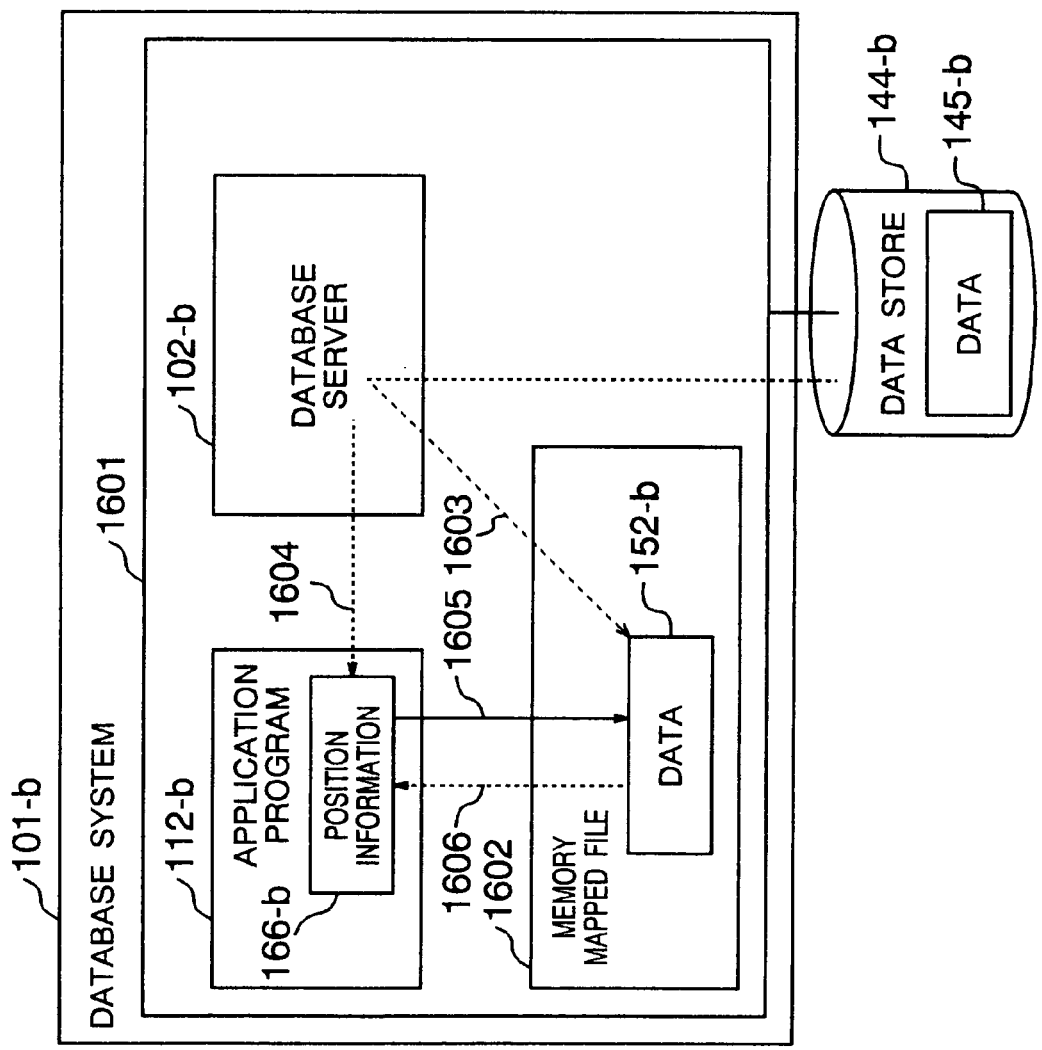

METHOD AND SYSTEM FOR MANAGING DATABASE HAVING A CAPABILITY OF PASSING DATA, AND MEDIUM RELEVANT THERETO

The present application is a continuation of application Ser. No. 09/317,434, filed May 24, 1999, now abandoned, the contents of which are incorporated herein by reference.

BACKGROUND OF THE INVENTION

The present invention relates to a method for processing a database, a system for processing a database, and a medium relevant thereto, and more particularly to a processing method for passing data in a database system configured in a client-server manner.

Concerning a method for managing in a database a massive amount of batch data ranging to several giga bytes such as moving picture data, video data and audio data, there has been proposed a method having a BLOB (Binary Large Object) system proposed by the SQL3 ("Database Language SQL", ISO Working Draft, July 1996). When an application program treats the BLOB data, the application program uses a variable consisting of four bytes called as a locator for uniquely identifying the BLOB data and creates the variable as the BLOB data when the value is evaluated.

For example, when a database system treats a massive amount of data, it is disadvantageously necessary to secure a large memory area for a program on which a user application is running. In order to overcome this disadvantage, as a method for treating the BLOB data by holding the BLOB data in a file without using a memory buffer for holding the massive amount of data in the application program, a file reference technique of the database managing system DB2 ("USING THE NEW DB2 IBM's Object-Relational Database System", Don Chamberlin, Morgan Kaufmann Publishers, Inc., 1996) may be used.

On the other hand, a relational database may employ a parallel database that enables to process a massive amount of data at fast speed. The parallel database may employ a function of selecting the most approximate parallel processing according to the content of query and the state of data in the parallel database (the function of which is disclosed in JP-A-6-214843).

Further, the object relational database ("OBJECT RELATIONAL DBMSs", Michael Stonebraker, translated by K. OHTA, International Thomas Publishing Japan, August 1996) has a technique of implementing a routine function of SQL3 by using the executable codes created by describing a routine function of SQL3 in a general-purpose programming language and manipulating multimedia data such as pictures through the use of the SQL using the routine.

As a method for sharing data between processes, a technique of a memory mapped file in an operating system UNIX and so forth may be referred (X/Open Portability Guide, XPG4V2).

SUMMARY OF THE INVENTION

The foregoing prior arts have the following problems.

(1) The foregoing method of the file reference is arranged to locate a file on a client node (which corresponds to a computer machine, that is, a unit composing a computer having a central processing unit as its basis) in which an application program (AP) is running, and holds BLOB data on the file. (The file treated outside of the database server is called as "an external file" herein-after.) If the AP issues a request of outputting the BLOB data held in the server to the file, the following process is executed.

(a) The database server reads the BLOB data at the server node.
(b) The server transfers the data to a client.
(c) The client writes the data in the external file.

In this case, the transfer of massive data between the client and the server in network communications or inter-process communications disadvantageously needs a longer time.

(2) The method of the file reference is arranged so that the database server outputs the BLOB data to the external file specified by the AP.

For example, hence, for outputting plural BLOB data units obtained as a result of the database query to the corresponding external files, the following complicated process has to be carried out.

(a) The process is specified to overwrite the BLOB data when it is outputted to the external file. The process is executed to change a title of the external file into another title or to copy the content of the external file into another file, each time one result is outputted.

(b) The process is specified to add the BLOB data when it is outputted to the external file. Then, the process is executed to divide the BLOB data from the external file and to output the divided BLOB data units to the corresponding files. If the size of the BLOB data is not clear, each time one result is outputted, the process is executed to hold the size of the added BLOB data and then divide the BLOB data as referring to the size.

Hence, for doing such a process, the description of the source code in the AP is made disadvantageously complicated.

Further, in the case of copying long BLOD data, disadvantageously, a large amount of storage is required.

(3) In the case of applying the file-reference method in the parallel database system, though the database server makes parallel accesses to plural BLOB data units by plural parallel database processes, the BLOB data unit is written to the external file one by one in one client on which the AP is running.

Hence, the concentration of load on the client brought about as a bottleneck, which serves to lower the performance.

It is an object of the present invention to provide a technique of overcoming the foregoing disadvantages (1) to (3) and speeding up the process of passing data from a database server to a user application in a database system.

It is a further object of the present invention to provide a technique of simplifying description of source codes used for treating data to be managed by the database in a user application.

It is a yet further object of the present invention to provide a technique of speeding up passing of plural data units between a database server and a user application in a parallel database system.

The foregoing and the other objects and the novel features of the present invention will become apparent from the description of this specification and the appended drawings.

The summaries of the representative ones of the present invention disclosed in the present application will be simply described as follows.

(1) A database processing method is arranged so that in a database system in a client-server manner for treating a massive amount of data, a database server operating in a server may output to a file the massive amount of data stored in a database requested by a user application operating in a client, and the user application may obtain the massive amount of data by referring to the file to which the massive amount of data is outputted.

(2) A database processing method is arranged so that the database server may create a file identifying information used for identifying the file to which the massive data is to be outputted, and notify the user application of the file identifying information from the database server, and the user application may obtain the massive amount of data by referring to the file with the file identifying information.

(3) A database processing method is arranged so that the user application may request the execution of a function defined in a database, the database server may execute the function according to the request given from the user application, the function may create the file identifying information of the file to which the massive amount of data is to be outputted, the function may output the massive amount of data to the file, and the function may notify the database server of the file identifying information.

(4) A database processing method is arranged so that in a parallel database arrangement plural processes for doing database processes in parallel are executed to output to a file the massive amount of data in parallel.

(5) A database processing method is arranged so that the user application may obtain the massive amount of data by referring to the file to which the massive amount of data is outputted by the database server at a node where the database server is operating.

(6) In a database processing system arranged in a client-server manner for treating a massive amount of data, the system comprises: means for enabling a database server operating in a server to output to a file a massive amount of data stored in a database requested by a user application operating in a client; and means for enabling the user application to obtain the massive amount of data by referring to the file to which said means is executed to output the massive amount of data.

(7) A database processing system comprises: means for enabling the database server to create a file identifying information for identifying the file to which the massive amount of data is to be outputted; means for notifying the user application of the file identifying information from the database server; and means for enabling the user application to obtain the massive amount of data by referring to the file with the file identifying information obtained by the notification.

(8) A database processing system comprises: means for enabling the user application to request the execution of a function defined in the database; means for enabling the database server to execute the function according to the request given from the user application; means for creating a file identifying information of a file to which the function is executed to output the massive amount of data; and means for enabling the function to notify the database server of the file identifying information.

(9) A database processing system comprises means for enabling the plural processes for concurrently processing databases in a parallel database arrangement to output the massive amount of data to the file in parallel.

(10) A database processing system comprises: means for enabling the user application to obtain the massive amount of data by referring to the file, to which the database server is executed to output the massive amount of data, at the same one as the node where the database server is operating.

(11) A computer-readable storage medium having recorded a program and data in a database processing system in a client-server manner, comprises: a first process in which a database server operating in the server outputs to a file a massive amount of data stored in a database requested by a user application operating in the client; and a second process of enabling the user application to obtain the massive amount of data by referring to the file to which the massive amount of data is outputted by the first process.

BRIEF DESCRIPTION OF THE DRAWINGS

FIG. 4 is a view showing an SQL definition sentence for defining table "employee";

FIG. 5 is a table showing row data stored in table "employee";

FIG. 6 is a view showing an SQL definition sentence for defining function "fileout( )";

FIG. 8 is a view showing part of a description of a source code of the application;

FIG. 9 is a view showing a table of retrieved results in the application;

FIG. 14 is a flowchart showing a process of "fileout" mounting function;

FIG. 15 is a conceptual view showing a summary of a database system composed of one node; and FIG. 16 is a conceptual view showing a summary of a database system having a memory mapped file.

DETAILED DESCRIPTION OF THE EMBODIMENTS

Hereafter, an embodiment of the present invention will be described in detail with reference to the appended drawings.

Figure 1:
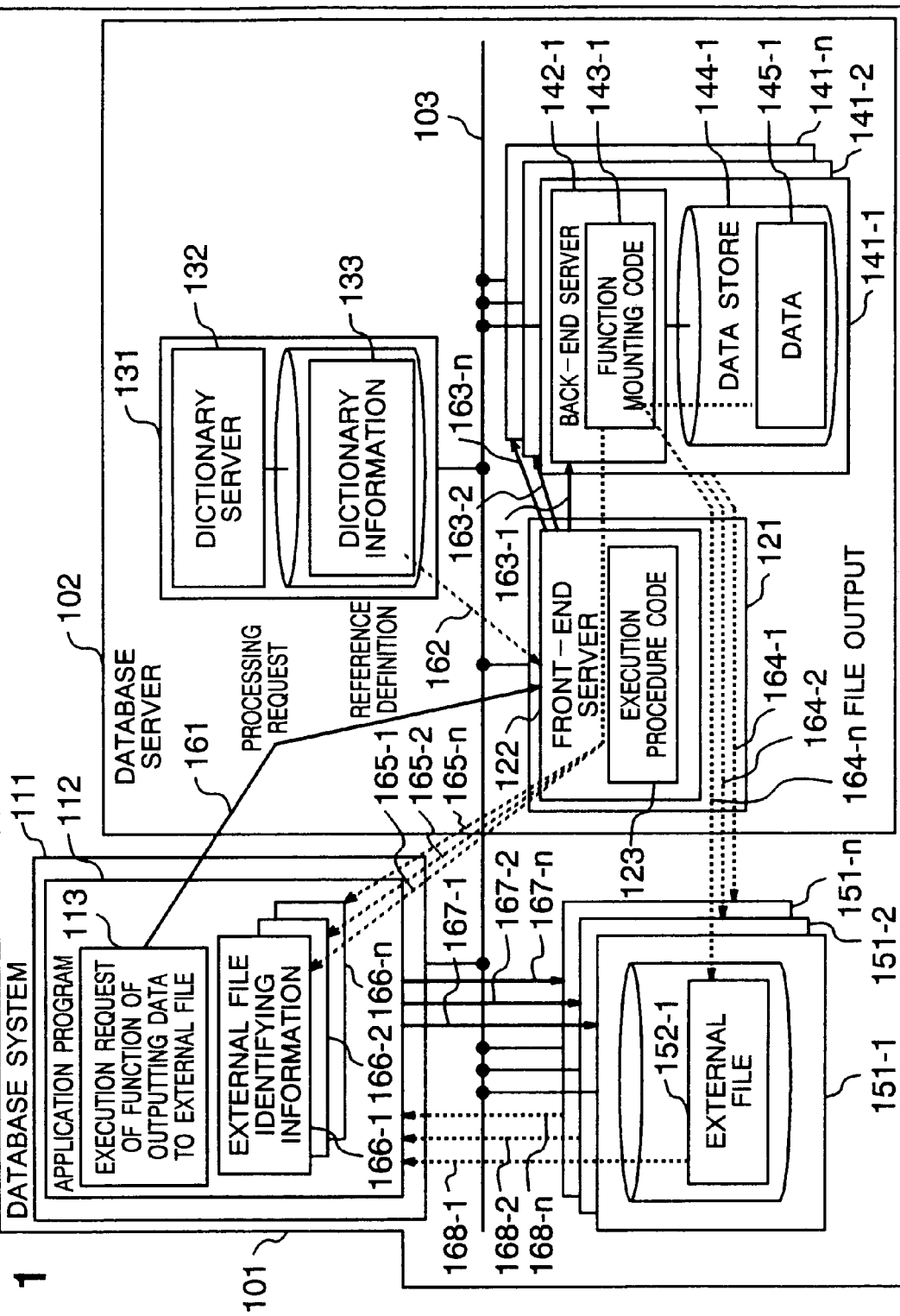
FIG. 1 is a conceptual view showing a summary of a process of treating a massive amount of data through an external file according to a first embodiment of the present invention.

FIG. 1 is a conceptual view showing a summary of a process of enabling a user application to obtain data from a database in a parallel database system according to an embodiment of the present invention.

As shown in FIG. 1, a database system 101 of this embodiment includes a node 111 served as a client in which an application program (AP) 112 is running, a node 121 in which a front-end server (FES) 122 is running, the FES 122 corresponding to a part of a function of a database server 102 which receives a query request from the AP 112, a node 131 in which a dictionary server (DS) 132 is running, the DC 132 corresponding to a part of a function of the database server 102 which manages dictionary information 133 containing a definition information and a storage structure information in the database system 101, a group of nodes 141-1, 141-2, . . . , 141-n in which plural backend servers (BES) 142-1, 142-2, . . . , 142-n are running, those backend servers corresponding to a part of the function of the database server 101 for executing database processes in the database system 101 in parallel, and a group of nodes 151-1, 151-2, . . . 151-n for holding external files 152-1, 152-2 . . . 152-n. Those elements are connected with one another through a network 103.

The BESs 142-1, 142-2, . . . , 142-n hold data 145-1, 145-2, . . . , 145-n to be manipulated by the AP 112 in data stores 144-1, 144-2, . . . , 144-n.

The nodes 151-1, 151-2, . . . , 151-n hold the external files 152-1, 152-2, . . . , 152-n in a common file system area to be accessed by both of the AP 112 and the database server 102.

The description will be oriented to the process of rapidly and simply obtaining the data stored in the database server through the effect of the AP in the system.

The AP 112 operates to transmit a query request to the FES 122 of the database server 102. This query request includes an execution request 113 of a function (corresponding to a sort of a routine of SQL3) for outputting data 145-1, 145-2, . . . , 145-n to the external files 152-1, 152-2, . . . , 152-n.

The FES 122 analyzes the query request from the AP 112. In analyzing the query request, the process is executed to obtain the storage structure information and information about the execution of the function in the data stores 144-1, 144-2, . . . , 144-n by referring to the dictionary information 133 of the DS 132 (arrow 162). Next, the FES 122 creates an execution procedure code 123 for the database process based on the analyzed information of the query request, sends out the code 123 to the BESs 142-1, 142-2, . . . , 142-n, and requests the BESs to do the database process (arrows 163-1, 163-2, . . . 162-n). The execution procedure code 123 contains an execution indication of a function having a capability of writing the data 145-1, 145-2, . . . , 145-n to the external files 152-1, 152-2, . . . , 152-n.

The BESs 142-1, 142-2, . . . , 142-n read the data 145-1, 145-2, . . . , 145-n from the data stores 144-1, 144-2, . . . , 144-n according to the execution procedure code 123, executes function mounting codes 143-1, 143-2, 143-n of the function of writing the data out to the external files, and create the external files 152-1, 152-2, . . . , 152-n (arrows 164-1, 164-2, . . . , 164-n).

As a result of executing the function mounting codes 143-1, 143-2, . . . 143-n, the BESs 142-1, 142-2, . . . , 142-n receive the titles of the external files as the executed results. After creating the external files, the BESs 142-1, 142-2, . . . , 142-n return back the executed results to the FES 122.

The FES 122 edits the executed results from the BESs 142-1, 142-2, . . . , 142-n to return them back to the AP 112 as the processed results, (arrows 165-1, 165-2, . . . , 165-n).

The AP 112 obtains the external file names (166-1, 166-2, . . . , 166-n) contained in the returned processed results to access the nodes having the external files 152-1, 152-2, . . . , 152-n, (arrows 167-1, 167-2, . . . , 167-n) and refer to the data held in the external files (arrows 168-1, 168-2, . . . , 168-n).

The foregoing process allows the direct transfer of the data between the client and the server to be eliminated, thereby being able to speed up the process.

Moreover, since each file name of the external files is created by the database server, it is possible to easily describe the source code in the user application.

Further, since the database server allows the plural external files to be written out in parallel, the process of outputting the external files may be sped up.

Figure 2:
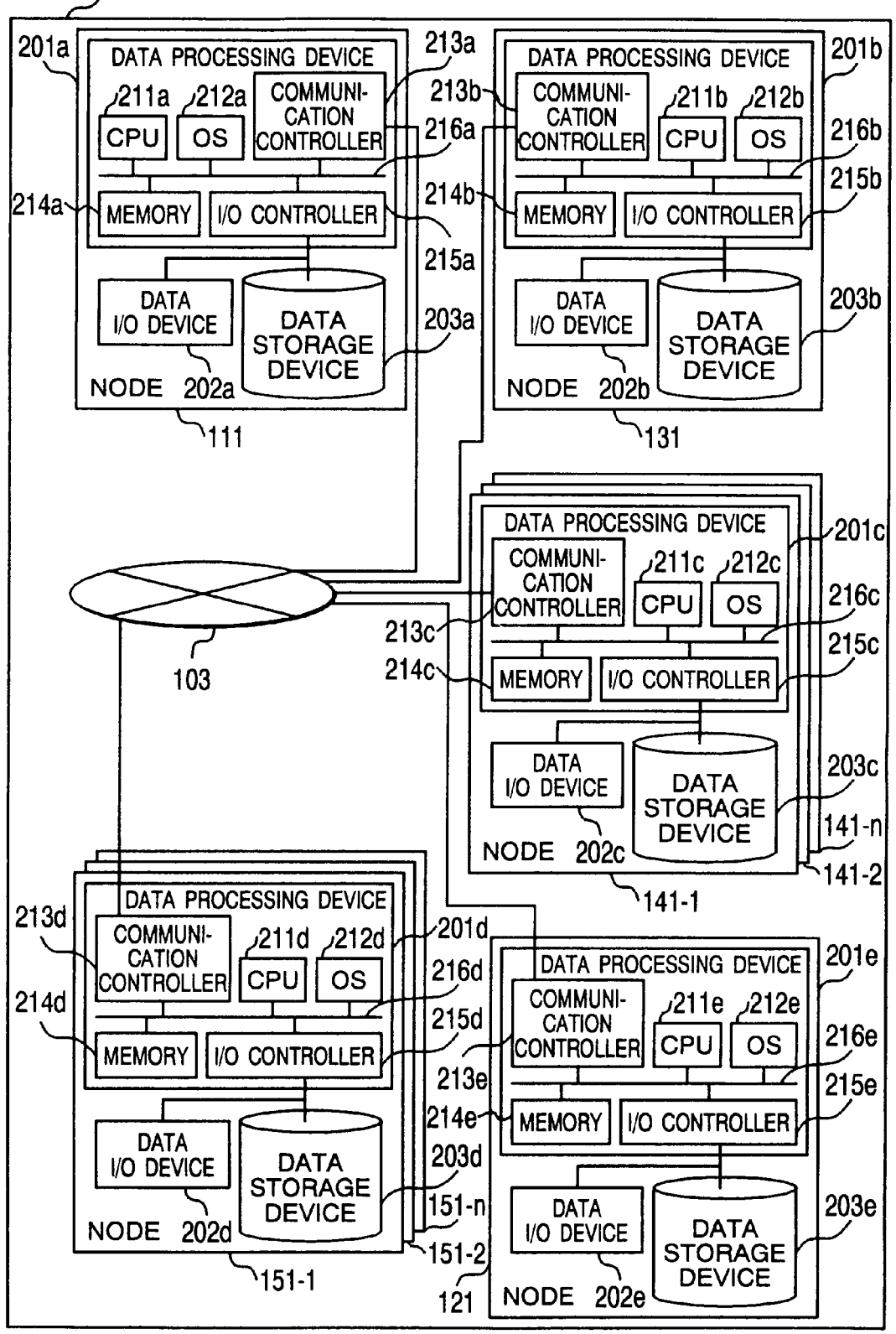
FIG. 2 is a schematic diagram showing a hardware arrangement according to the embodiment shown in FIG. 1.

FIG. 2 is a schematic diagram showing a hardware arrangement of the embodiment shown in FIG. 1.

As shown in FIG. 2, in the database system 101, nodes 111, 121, 131, 141-1, 141-2, . . . , 141-n, 151-1, 151-2, . . . , 151-n each of which corresponds to the processing unit are connected through a network 103 such as a LAN (Local Area Network), so that those nodes may do communication with each other through the network 103.

Each of the nodes 111, 121, 131, 141-1, 141-2, . . . , 141-n, 151-1, 151-2, 151-n includes a general computer arrangement, and comprises a data processing device 201a, 201b, 201c, 201d or 201e, a data I/O device 202a, 202b, 202c, 202d or 202e such as a keyboard, a mouse and a display, and a data storage device 203a, 203b, 203c, 203d or 203e such as a disk device. The data processing device 201a, 201b, 201c, 201d or 201e is composed of a central processing unit (CPU) 211a, 211b, 211c, 211d or 211e, an operating system (OS) 212a, 212b, 212c, 212d or 212e, a communication controller 213a, 213b, 213c, 213d or 213e connected to the network 103, a main storage unit 25 (memory) 214a, 214b, 214c, 214d or 214e, an I/O controller 215a, 215b, 215c, 215d or 215e, and a system bus 216a, 216b, 216c, 216d or 216e for connecting those components. The data I/O device 202a, 202b, 202c, 202d or 202e is connected to the I/O controller 215a, 215b, 215c, 215d or 215e.

Figure 3:
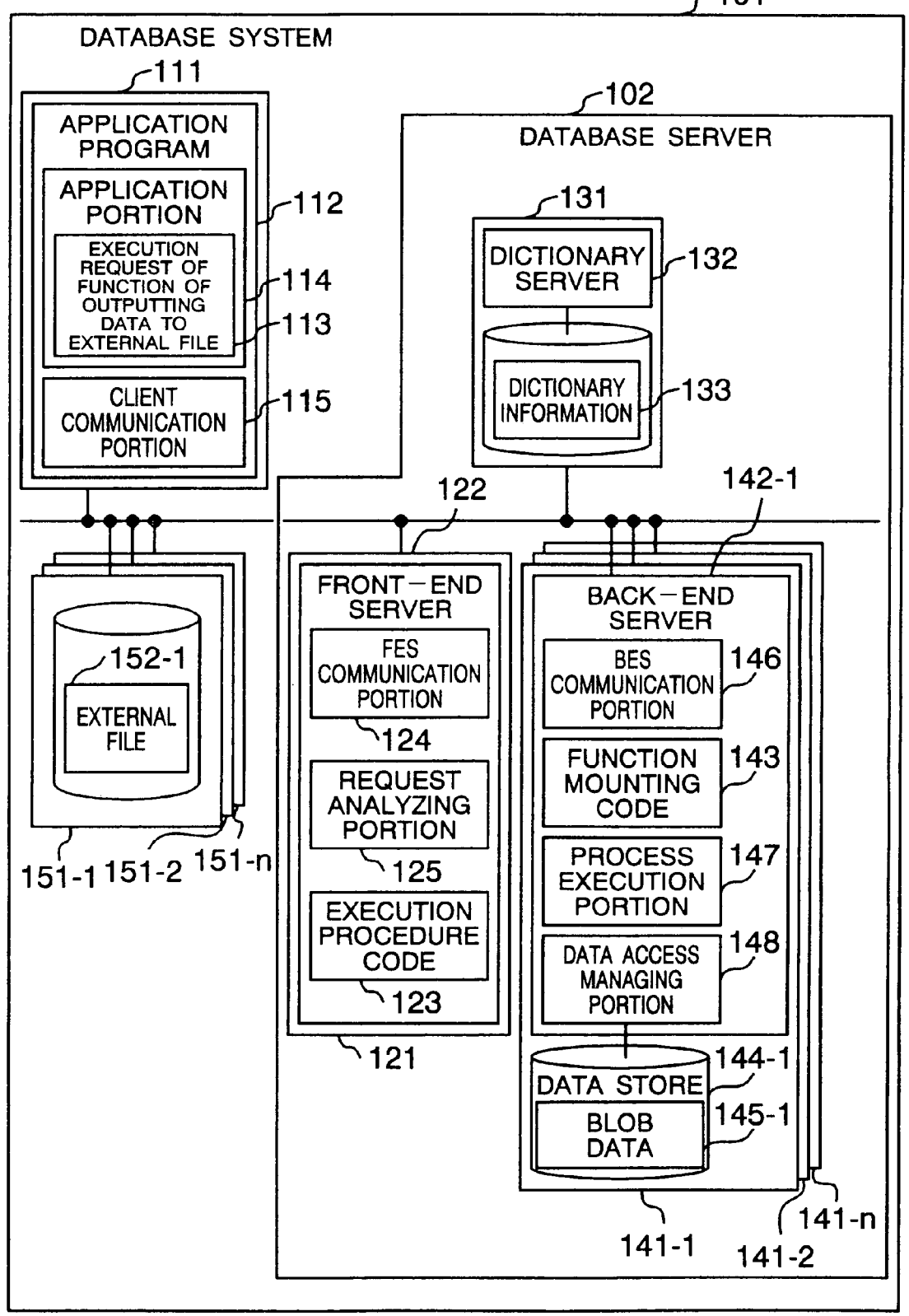
FIG. 3 is a schematic diagram showing a function arrangement of a database system according to the embodiment shown in FIG. 1.

The function of the program shown in FIGS. 1 and 3 is implemented by executing the programs stored in the memories 214a, 214b, 214c, 214d and 214e. The execution of the programs are done by the CPUs 211a, 211b, 211c, 211d and 211e under the control of the OSs 212a, 212b, 212c, 212d and 212e.

FIG. 3 is a schematic diagram showing a function arrangement of the database system in the embodiment of the present invention shown in FIG. 1.

The database system 101 comprises a node 111 of a client in which the AP 112 is running, a node 121 in which the FES 122 for receiving a query request from the AP 112 is running, a node 131 in which a dictionary server (DS) 132 for managing the dictionary information 133 is running, a plurality of nodes 141-1, 141-2, . . . , 141-n in which the BESs 142-1, 142-2, . . . , 142-n for executing the database process in parallel are running, and nodes 151-1, 151-2, . . . , 151-n for holding the external files 152-1, 152-2, . . . , 152-n.

Those nodes are mutually connected through the network 103. The AP 112 comprises an application portion 114 containing a code for doing a data process in response to a user's request, and a client communication portion 115 for managing the communication with a database server. The application portion 114 includes a code 113 for requesting the execution of a function of outputting the data to the external file.

The FES 122 comprises an FES communication portion 124 for managing a reception of a request from the client and a reply of the database processed result to the client, and a request analyzing portion 125 for analyzing the request from the client to generate the execution procedure code 123 indicating the executing procedure of the database process.

Each of the BESs 142-1, 142-2, . . . , 142-n comprises a BES communication portion 146 for managing a reception of a request from the FES 122 and a reply of the database processed result to the FES 122, a process execution portion 147 for doing a database process according to an indication contained in the execution procedure code 123, and each of data access managing portions 148-1, 148-2, . . . , 148-n for managing access onto the data stores 144-1, 144-2, . . . , 144-n holding the data.

Later, the description will be oriented to the database process, to which the present invention is applied, with an example of an application in detail. The following description will be expanded with an example of the management of information about employees in the database system 101-. The AP 112 is assumed to have a function of querying the names and the photos of all the employees belonging to the design division of the company and displaying the results in a list.

The information about employees is represented by table "employee". Table "employee" includes column "empno" for indicating the employee's numbers, column "name" for indicating the employee's names, column "dept" for indicating the divisions to which the employees belong, and column "photo" for indicating the photos of the employees.

FIG. 4 shows the SQL definition sentence 401 for defining table "employee". Hereafter, the meaning of each row will be described.

402: Defines the table titled as "employee", which consists of the following columns.

403: INTEGER type column, the title of which is "empno".

404: VARCHAR type (within 30 bytes) column, the title of which is "name".

405: VARCHAR type (within 30 bytes) column, the title of which is "dept".

406: BLOB type (within 10 mega bytes) column, the title of which is "photo".

By doing a general database process on the definition sentence 401, the definition of the table is registered in the dictionary information 133.

Based on the registered definition, the database server 102 will refer to the dictionary information 133 to obtain the information about the column composition in the table and the information required for accessing the data stored according to the definitions in the table.

FIG. 5 is a schematic view showing the table in which the data about the employees is stored based on the definition 401.

The table 501 for storing the row data consists of column "empno" 511, column "name" 512, column "dept" 513, and column "photo" 514.

The meaning of the row data is indicated as follows. 521: The values of columns "empno", "name" and "dept" are INTEGER type numeric value "1789", VARCHAR type character string "George", and VARCHAR type character string "design". The value of column "photo" is an identifying information ("blob1") of the BLOB data. This data 521 represents that the employee's number is "1789", the employee's name is "George", the belonging division of the employee is the design division, and the photo data is the BLOB data identified by "blob1".

In addition, the column values of the BLOB data are stored in such a common manner that the identifying information of the BLOB data is held in the column value and the entity of the BLOB data is held in another area of the data store.

Later, the similar row data will be briefly described.

522: The values of columns "empno", "name" and "dept" are INTEGER type numeric value "1789", VARCHAR type character string "John", and VARCHAR type character string "account". The value of column "photo" is an identifying information ("blob2") of the BLOB data.

523: The values of columns "ernpno", "name" and "dept" are INTEGER type numeric value "1801", VARCHAR type character string "Thomas", and VARCHAR type character string "design". The value of column "photo" is an identifying information ("blob3") of the BLOB data.

524: The values of columns "empno", "name" and "dept" are INTEGER type numeric value "1809", VARCHAR type character string "James", and VARCHAR type character string "general". The value of column "photo" is an identifying information ("blob4") of the BLOB data.

525: The values of columns "empno", "name" and "dept" are INTEGER type numeric value "1829", VARCHAR type character string "Andrew", and VARCHAR type character string "account". The value of column "photo" is an identifying information ("blob5") of the BLOB data.

526: The values of columns "empno", "name" and "dept" are INTEGER type numeric value "1837", VARCHAR type character string "Martin", and VARCHAR type character string "planning". The value of column "photo" is an identifying information ("blob6") of the BLOB data.

In turn, the description will be oriented to function "fileout( )" for providing a function of writing the BLOB data to the external file.

The interface of function "fileout( )" is specified so that an input (argument of the function) is the BLOB type data and an output (return value of the function) is the VARCHAR type (within 255 bytes) character string.

This function "fileout( )" has a capability of writing the content of the BLOB data inputted as the argument to the external file. The name of the external file to which the content of the BLOB data is to be written is created by this function itself. Then, the name of the external file to which the content of the BLOB data is to be written is returned as the return value of the function. At the nodes 151-1., 151-2, . . . , 151-n shown in FIG. 3, the external files are created in the common file system area.

The processing content of this function "fileout( )" will be described with reference to FIG. 14. The function "fileout( )" is defined by the SQL definition sentence as shown in FIG. 6.

The meaning of each row of the definition sentence 601 of the function will be indicated as below.

602: Defines the function named as "fileout", the argument of which is a BLOB type value.

603: The return value is a VARCHAR type (within 255 bytes) value.

604: The executable code mounting this function (function mounting code) is held in a file named "bin/fileout".

605: The source code of the function mounting code is described in the C language.

By doing a general database process based on the definition sentence 601, the definition of the function is registered in the dictionary information 133 (see FIG. 3).

Based on the registered definition, the database server 102 will refer to the dictionary information 133 to obtain the information required for executing the function, such as an I/O of the function "fileout( )" and the name of the function mounting code "bin/fileout".

Figure 7:
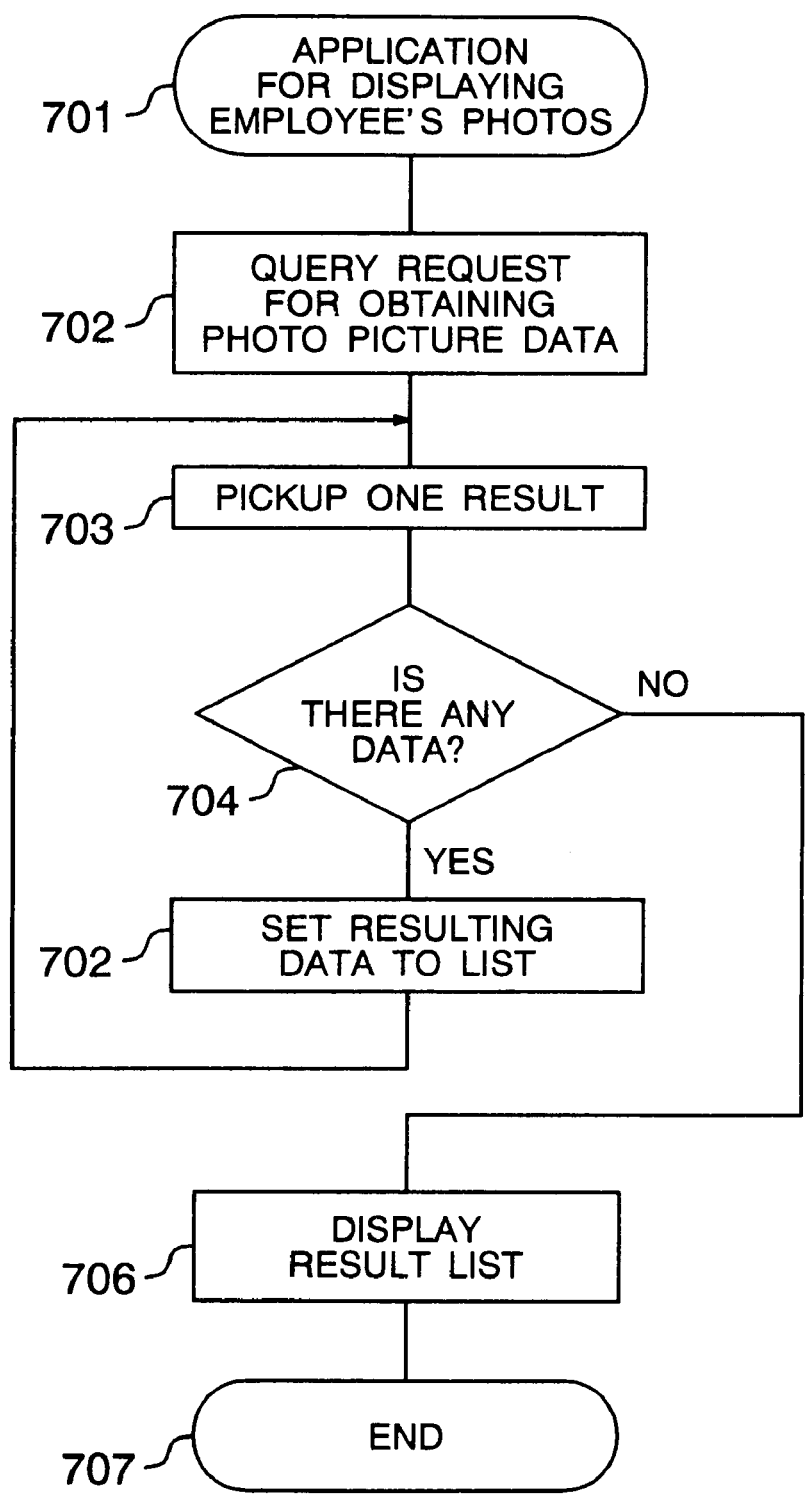
FIG. 7 is a flowchart showing a process executed in an application.

FIG. 7 is a flowchart showing a summary of a process executed in the application portion 114 of the AP 112.

This flowchart shows a process (701) of displaying the photo data of all the employees belonging to the design division in a list.

At first, the process is executed to issue a query request of "obtain the names and the photo data of all the employees belonging to the design division" (step 702).

Next, the process is executed to pick up the result of the query request (step 703). It is determined if data can be obtained in the picked result (step 704). If data exists in the picked result, the result data is set to a list (step 705). Then, the process returns to the step 703.

If no data exists in the result picked at the step 704, that is, if data in all the retrieved results is obtained, the list of the result data (containing the pictures of the photo data) is displayed (step 706), and then the process is terminated (step 707).

FIG. 8 shows a part of a source code for creating the application for doing the process shown in FIG. 7.

The meaning of each row of a part 801 of the source code included in the application is indicated below.

802: Start the declaration of an SQL variable.

803: Declare variable "photoFilename" (hold a name of an external file to which the photo data is to be outputted).

804: Declare variable "empName" (hold the names of the employees).

805: Finish the declaration of the SQL variable.

806: Define cursor "curs1" for an SQL retrieval sentence of the rows 807 to 809.

807: The retrieval projection item is a call of function "fileoutQ" with columns "name" and "photo" as the arguments.

808: The table to be retrieved is "employee".

809: The retrieval condition is that the value of column "dept" is character string value "design" (which means that the belonging division is the design one).

810: Request to open a cursor.

811: The process up to the row 815 is repeated.

812: Request to fetch cursor "curs1". The result is held in variables "empName" and "photoFilename".

813: If no data exists in the fetched result, the process goes out of the repetitive process.

814: Call function "setImageDataToList( )". The manes of the employees and the external file name are passed to the arguments. Herein, function "setImageDataToList( )" is a code linked to the application though not shown. It has a function of setting the resulting data to the data having a general list structure.

815: Indicate the end of the repetitive process range from the row 811.

816: Request to close the cursor.

817: Call function "displayImageDataList( )".

Herein, function "displayImageDataList ( )" is a code linked to the application though not shown. This function has a simple data manipulating capability of creating a HTML (Hypertext Markup Language) text file of the result list based on the list of the resulting data set in function "setImageDataToListo" and displaying the list through the use of the HTML browser. In displaying the list, the pictures of the photo data are also displayed in a thumbnail manner after reading the picture file.

The source code 801 utilizes-table "employee" defined in FIG. 4 and function "fileout( )" shown in FIG. 6. The database server has already returned back the name of the external file. This thus eliminates the necessity of creating the file name and copying the file in the source code. This serves to simplify the description of the AP.

Further, using the source code 801, the AP 112 is created in the following general procedure.

(1) The source code of the application is converted into the source code of the host language through a preprocessor contained in a tool for developing the application generally belonging to the database system.

(2) Using the compiler of the host language, the converted source code is converted into the object code. This object code is made to be the application portion 114 of the AP 112. In particular, the function execution request 113 is created based on the portion for calling the function with the SQL sentence (rows 806 to 810 and 811).

(3) The AP is created by linking to the library containing the code having the function of the client communication portion 115.

FIG. 9 shows the retrieved result obtained by the process shown in FIGS. 11 to 14 during the process of the AP 112 shown in FIGS. 7 and 8.

The result of retrieving the database is made to be a table 901. The table 901 contains a row having a combination of a name of an employee belonging to the design division and a name of the external file holding the picture data about the employee.

The table 901 of the retrieved result consists of a column (911) for "name" specified to a projection item of a retrieval sentence and a column (912) for "fileout(photo)" specified to a projection item of the retrieval sentence.

The meaning of each row data is indicated as follows.

921: The column 911 has a value of "George". The column 912 has a value of "dbsvexfile1".

It indicates that the name of the employee is George and the photo data of the employee is held in the external file named "dbsvexfile1".

922: The column 911 has a value of "Thomas". The column 912 has a value of "dbvexfile2".

It indicates that the name of the employee is Thomas and the photo data of the employee is held in the external file named "dbsvexfile2".

Figure 10:
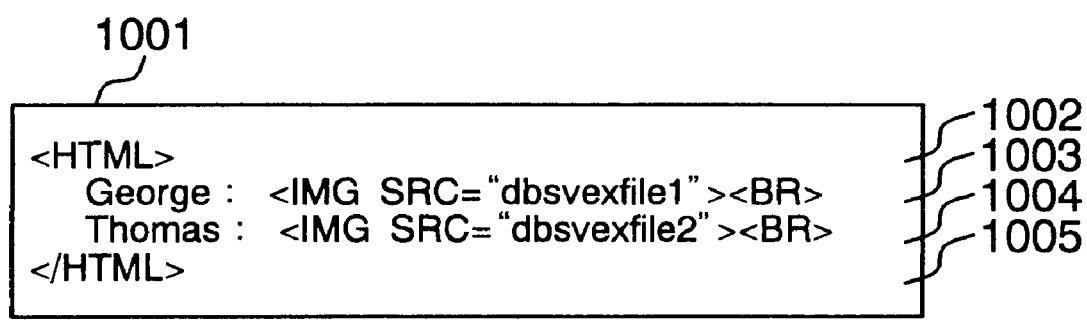
FIG. 10 is a view showing a list of retrieved results created by the application.

FIG. 10 shows the HTML text of the result list created by the AP 112 based on the retrieved result shown in FIG. 9.

The meaning of each row of the HTML text (1001) is indicated as below.

1002: Start of HTML text.

1003: It indicates that character string "George" and the picture data held in file name "dbsvexfile1" are displayed, and then the sentence is line-fed.

1004: It indicates that character string "Thomas" and the picture data held in file name "dbsvexfile2" are displayed and then the sentence is line-fed.

1005: End of HTML text

The AP 112 is executed to apply this HTML text 1001 into the common HTML browser function for displaying the results in a list (concretely, the manes of the employees and the photos of the employees). The picture data in files "dbsvexfile1." and "dbsvexfile2" are read from the HTML browser function and then is displayed.

As described above, the AP enables to directly obtain the data with the external file name without having to receive the data transferred from the database server in communication.

Figure 11:
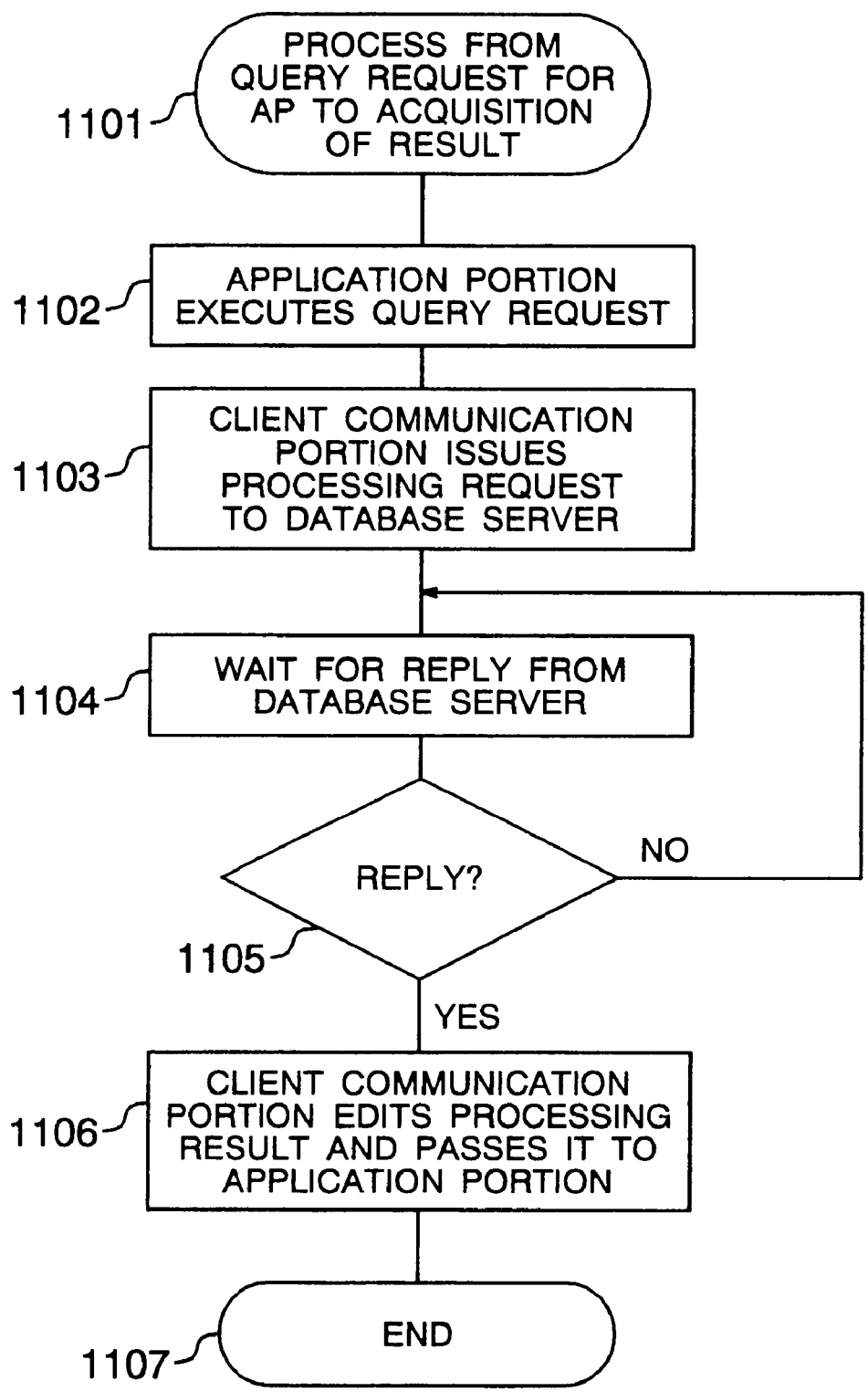
FIG. 11 is a flowchart showing a process ranging from a query request in an AP (Application Program) to the obtained result.

FIG. 11 is a flowchart showing a summary of a process ranging from a query request to the acquisition of the result in the AP 112.

It indicates a flow of the general process in the case of executing the database process such as the forgoing application.

At the step 703 of the flowchart shown in FIG. 7, the process (1101) for issuing the query request and obtaining the result is indicated.

At first, the AP 112 executes the query request contained in the application portion 114 (step 1102). This query request contains a process of calling a function of a database process executing request transmission provided by the client communication portion 115.

Next, the client communication portion 115 operates to transmit the query request to the FES 122 of the database server 102 (step 1103). After the query request is received in the FES 122, the details of the database process will be described below with reference to FIGS. 12 to 14.

The client communication portion 115 enters into a waiting state for a reply from the FES 122 (step 1104). When it receives the reply from the FES 122 (step 1105), the client communication portion 115 operates to edit the result of the database process returned back thereto, to pass it to the application portion 114 (step 1106), and then to terminate the process of its own (step 1107).

Figure 12:
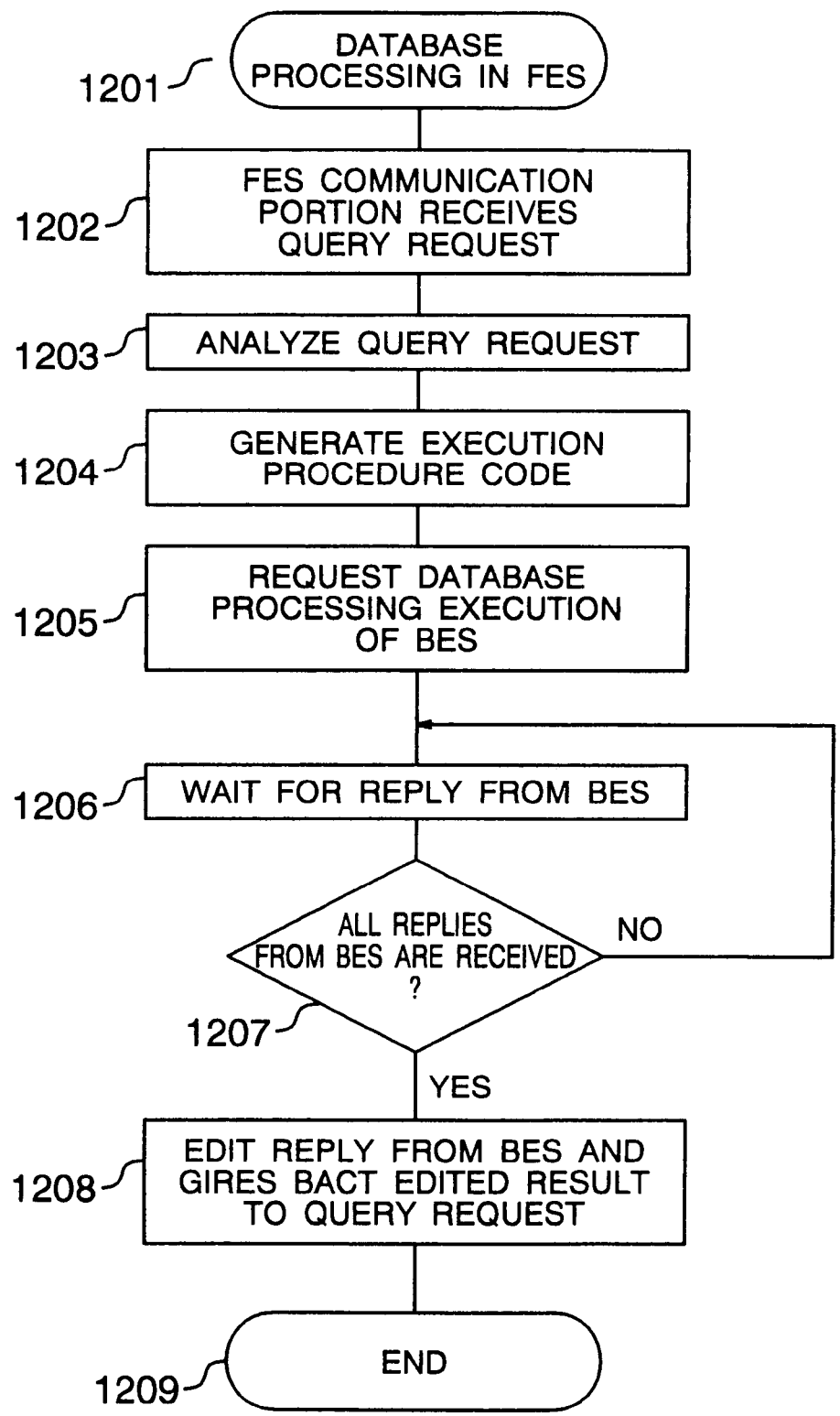
FIG. 12 is a flowchart showing a database-process in an FES of a database server.

FIG. 12 is a flowchart showing the database process (step 1201) executed in the FES 122 at the step 1103 in FIG. 11.

At first, the FEE communication portion 124 in the FES 122 receives the query request from the client communication portion 115 (step 1202).

Next, the query request received by the request analyzing portion 125 is analyzed (step 1203). In analyzing the query request, the request analyzing portion 125 requests the dictionary information 133 to the DS 132, and then obtains the information used for accessing the data requested by the AP and the information used for executing the function by referring to the dictionary information 133.

Herein, the retrieval request is recognized for table "employee". Then, the process is executed to select us the procedure of sequentially processing the row data for meeting the condition about the row data of table "employee" stored as shown in FIG. 5 based on the definition shown in FIG. 4.

Further, in the query, it is recognized that the execution request for function "fileout( )" is issued.

Based on the definition shown in FIG. 6, the information used for executing the function execution code 143 is obtained.

In succession, the request analyzing portion 125 creates the execution procedure code 123 for doing the database process in the BES 142-1, 142-2, . . . , 142-n based on the result analyzed in step 1203 (step 1204).

The execution procedure code i23 contains a code about the procedure of accessing the row data stored in table "employee" as shown in FIG. 5 and a code about the procedure of executing the function mounting code 143.

Next, the FES communication portion 124 operates to transmit the process execution request to the BESs 142-1, 142-2, . . . , 142-n so that the database process may be executed by using the execution procedure code 123 (step 1205).

The database process in the BESs 142-u, 142-2, . . . , 142-n will be described in detail in FIG. 13.

Next, the FES communication portion 124 waits for a reply from the BESs 142-1, 142-2, . . . , 142-n (step 1206).

The FES communication portion 124 determines if all the replies from the BESs 142-1, 142-2, . . . , 142-n are received (step 1207). If all the replies are received, the FES communication portion 124 edits the database process result contained in the replies, and returns back the edited result to the client communication portion 115 that has issued the query request (step 1208), and then terminates the process of its own (step 1209).

Figure 13:
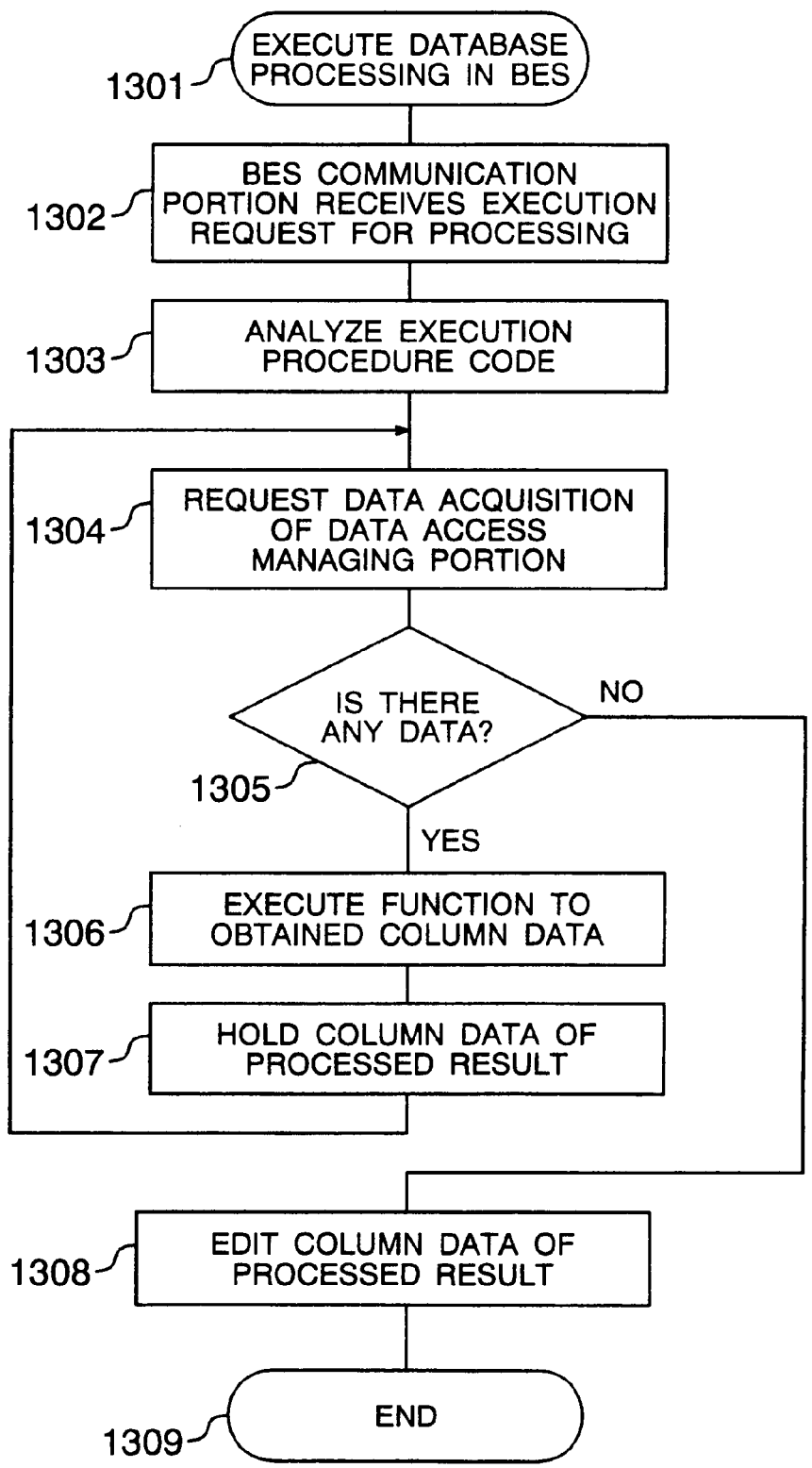
FIG. 13 is a flowchart showing a database process in a BES of a database server.

FIG. 13 is a flowchart showing a summary of a process of executing the database process according to the execution procedure code 123 in the BESs 142-1, 142-2, . . . , 142-n.

A process (step 1301) is executed according to the database process executing request at the step 1205 shown in FIG. 12.

At first, the BES communication portion 146 (see FIG. 3) receives the database process executing request from the FES communication portion 124 (step 1302).

This database process executing request contains the execution procedure code 123.

Next, the process executing portion 147 analyzes the execution procedure code 123 contained in the communication data (step 1303).

Herein, the process is executed to obtain only the values of columns "name" and "photo" about the row data for meeting the condition contained in the row data of table "employee" stored as shown in FIG. 5. Then, it is recognized that the sequential function mounting code 143 is to be executed. Later, the process is proceeded along the execution procedure recognized by the analysis.

The process execution portion 147 (see FIG. 3) gives the data access managing portion 148 a request for obtaining the row data for meeting the retrieval condition according to the analyzed result of the execution procedure code 123 at the step 1303.

Herein, the process execution portion 147 requests the row data that the value of column "dept" is character string "design".

Next, it is determined if the row data can be obtained (step 1305). If it is obtained, the function mounting code 143 ("bin/fileout") is executed for the value of the obtained column "photo" according to the analyzed result of the execution procedure code 123 (step 1306).

The program for operating the BES is dynamically linked with the function mounting code "bin/fileout" when it is in execution. At this time, the BLOB data that is the column value of column "photo" is passed as an argument to the program. For passing the data, it is possible to use the BLOB locator of the SQL3. The BLOB data may be manipulated through the locator.

As a result of executing the function mounting code, the VARCHAR type value that is the name of the external file can be obtained as a return value.

The process of the function mounting code "bin/fileout" will be described with reference to FIG. 14.

Next, the process is executed to create and hold the column data of the database process result based on the obtained column value and the return value of the function (step 1307), and then to repeat the process from the step 1304.

Further, if no data for meeting the retrieval condition can be obtained at the step 1305, that is, if all data for meeting the retrieval condition have been already obtained, the column data of the database process result is edited (step 1308), and then the process is terminated (step 1309).

This process is executed to process the row data 521 and 523 belonging to the design division, that is, column "dept" having a value of "design" (the data corresponding to the employees George and Thomas) and to create the data on which the column data 921 and 922 of the result table shown in FIG. 9 (the column data having a combination of an employee's name and an external file name).

FIG. 14 is a flowchart showing a summary of a process of "bin/fileout" that is the mounting code of function "fileout( )"

FIG. 14 shows the process (step 1401) of "bin/fileout" executed at the step 1306 shown in FIG. 13.

At first, the external files 152-1, 152-2, 152-n are created and opened on the areas of the common file system to the nodes 151-1, 151-2, . . . , 151-n shown in FIG. 3 (step 1402).

Herein, the name of the external file is created by using function "tempnam( )" of the C library. Hence, the external file can be uniquely identified by this name.

Next, the process is executed to read the BLOB data inputted at an argument, and to write the data onto the file opened at the step 1402 (step 1403).

Next, the external file is closed (step 1404), and then the process is terminated (step 1406) with the external file name as the return value (step 1405).

Herein, the external file name of the return value is passed to the AP 112 as the processed result. The AP 112 enables to refer to the external files 152-1, 152-2, . . . , 152-n that are located in the common file system area so that the AP 112 can obtain the data without having to transfer the data between the AP and the database server.

Further, the identifier name of the external file is created by the database server, so that the description of the source code of the application is made simpler as mentioned above.

Moreover, the parallel database process is arranged so that the BESs 142-1, 142-2, . . . , 142-n may output the BLOB data to the corresponding external files in parallel. It means that this parallel database process offers a faster process than the foregoing prior art arranged so that only the client outputs the data.

Next, the description will be oriented to another embodiment of the present invention with reference to FIG. 15.

FIG. 15 is a conceptual view showing a summary of a database system composed of one node. This is an example of a system for saving the process cost of the file access between the plural nodes and thereby speeding up the acquisition of the data.

The database system 101-a is composed of one node 1501, the function arrangement of which is the same as the arrangement shown in FIGS. 1 and 3. FIG. 15 shows only the main functions.

In this arrangement, the same process as the process of the foregoing AP 112 is executed.

That is, the AP 112-a issues a query request to the database server 102-a (step 1511). Then, the database server 102-a executes the mounting function code 143-a, reads out the BLOB data 145-a held in the data store 144-a (step 1512), and then outputs the BLOB data 145-a to the external file 152-a (step 1513). Then, the AP 112-a operates to refer to the external file 152-a for obtaining the BLOB data 145-a (step 1514).

In this process, the flow of the data until the BLOB data 145-a is obtained by the AP 112-a is indicated as follows.

(1) The database server 102-a reads the BLOB data 145-a.

(2) The database server 102-a outputs the BLOB data 145-a to the external file 152-a.

(3) The AP 112-a reads the BLOB data 145-a from the external file 152-a.

During this interval, no BLOB data is communicated through a network or between the processes. Hence, as compared with the foregoing prior art in which the data is inevitably transferred, this embodiment may offer a faster process speed.

In turn, the description will be oriented to another embodiment of the present invention with reference to FIG. 16.

FIG. 16 is a conceptual view showing a summary of a database system arranged to use a memory mapped file. This database system 101-b uses the memory mapped file 1602 in place of the external file. The other basic system arrangement is the same as that shown in FIG. 1 or FIG. 15. In this embodiment, at one node 1601, the AP 112-b and the database server 102-b are operated. The database server 102-b operates to set data (152-b) to an area of the memory mapped file 1602, and then to return back a position information 166-b containing the memory mapped file identifier and the memory address as the identifier of the area to the AP 112-b (arrow 1604). The AP operates to refer to the memory area based on the position information 166-b (arrow 1604) for obtaining the data 152-b (arrow 1606).

This thus makes it possible to speed up the AP's process of obtaining the data not by using a data storage device such as a disk but by using a faster accessible memory.

The process of the foregoing flowchart can be implemented by executing the program in the data processing device. The program can be stored in a storage medium to be accessed by a computer such as a hard-disk device or a floppy disk, so that the access to the program is made possible through the network.

In the database system arranged in a client-server manner, the database server provides means for outputting data to a storage device and enabling the user application to directly refer to the area of the data for obtaining the data. Hence, no data is required to be transferred between the client and the server, so that the fast processing is made possible.

Further, the database server provides means for creating an identifier of an area on the storage device. Hence, if the application uses two or more pieces of data, it is not necessary to sequentially specify the identifier of the storage area, which therefore makes the description of the application simpler.

In the parallel database arrangement, the database server provides means for outputting the plural pieces of data to the storage device in parallel. This thus makes it possible to output the data to pass the data to the AP at fast speed.

According to the present invention, in the case of storing a massive amount of data in the database and treating the data in the application, the communication cost and the necessary amount of memory may be greatly reduced. This is quite advantageous.

What is claimed is:

1. A database processing method used in a database system arranged in a client-server manner, comprising the steps of:

performing a first process, responsive to a request of a program being executed at a client, of enabling a database server operating at a server to transfer Large Object (LOB) data, which has been processed on a database, from said database to a common storage device which is shared between said client and said server, said common storage device being separated from said client and said server through a network, and being other than a storage device to which said database is stored, and enabling said database server operating at said server to respond to said request by transmitting identifying information, which identifies a particular storage area of said common storage device to which said LOB data is stored, to said program; and performing a second process enabling said program being executed at said client to refer to said particular storage area of said common storage device for said LOB data, based on said identifying information including a processed result of said LOB data, to retrieve the transferred LOB data from said storage area of said common storage device into said program, wherein said common storage device stores said LOB data transferred to said common storage device by said database server for subsequent retrieval by said program and outputs said LOB data in response to a retrieval request from said program.

2. A database processing method as claimed in claim 1, further comprising:
a third process of enabling said program to request an execution of a function defined in said database;
a fourth process of enabling said database server to execute said function according to said execution request from said program;
a fifth process of enabling said function to create a storage area identifying information of said common storage device to which, said data is output;
a sixth process of enabling said function to transfer said data to said storage area; and
a seventh process of enabling said function to notify said database server of said storage area identifying information.

3. A database processing method as claimed in claim 1, further comprising:
an eighth process of enabling plural processes,
wherein said eighth process has a parallel database arrangement, and executes database processes in parallel and outputs processed LOB data to said common storage device in parallel.

4. A database processing method as claimed in claim 1, further comprising:
a ninth process of enabling said program to refer to said common storage device to which processed LOB data is output by said database server as the same node as a node where said database server is in operation to retrieve said LOB data.

5. A database processing system used in a database system arranged in a client-server manner, comprising:
first means, responsive to a request of a program being executed at a client, for enabling a database server operating at a server to transfer Large Object (LOB) data, which has been processed on a database, from said database to a common storage device which is shared between said client and said server, said common storage device being separated from said client and said server through a network and being other than a storage device to which said database is stored, and enabling said database server operating at said server to respond to said request by transmitting identifying information, which identifies a particular storage area of said common storage device to which said LOB data is stored, to said program; and
second means for enabling said program being executed at said client to refer to said particular storage area of said common storage device for said LOB data, based on said identifying information including a result of processing said LOB data, to retrieve the transferred LOB data from said storage area of said common storage device into said program,
wherein said common storage device stores said LOB data transferred to said common storage device by said database server for subsequent retrieval by said program and outputs said LOB data in response to a retrieval request from said program.

6. A database processing system as claimed in claim 5, further comprising:
third means for enabling said program to request an execution of a function defined in said database;
fourth means for enabling said database server to execute said function according to said execution request from said program;
fifth means for enabling said function to create a storage area identifying information of said common storage device to which said data is output;
sixth means for enabling said function to output said data to said storage area; and
seventh means for enabling said function to notify said database server of said storage area identifying information.

7. A database processing system as claimed in claim 5, further comprising:
eighth means for enabling plural processes,
wherein said eighth process has a parallel database arrangement, and executes database processes in parallel and outputs processed LOB data to said common storage device in parallel.

8. A database processing system as claimed in claim 7, further comprising:
ninth means for enabling said program to refer to said common storage device to which processed LOB data is output by said database server as the same node as a node where said database server is in operation to retrieve said LOB data.

9. A computer readable storage medium having stored therein an executable program which is executed in a database processing system used in a database system arranged in a client-server manner, comprising:
first code means, responsive to a request of a program being executed at a client, of enabling a database server operating at a server to transfer Large Object (LOB) data, which has been processed on a database, from said database to a common storage device which is shared between said client and said server, said common storage device being separated from said client and said server through a network, and being other than a storage device to which said database is stored, and enabling said database server operating at said server to respond to said request by transmitting identifying information, which identifies a particular storage area of said common storage device to which said LOB data, to said program; and
second code means of enabling said program being executed at said client to refer to said particular storage area of said common storage device for said LOB data, based on said identifying information including a result of processing said LOB data, to retrieve the transferred LOB data from said storage area of said common storage device into said program,
wherein said common storage device stores said LOB data transferred to said common storage device by said database server for subsequent retrieval by said program and outputs said LOB data in response to a retrieval request from said program.

10. A computer readable storage medium as claimed in claim 9, further comprising:
third code means of enabling said program to request an execution of a function defined in said database;
fourth code means of enabling said database server to execute said function according to said execution request from said program;
fifth code means of enabling said function to create a storage area identifying information of said common storage device to which said data is output;
sixth code means of enabling said function to output said data to said storage area; and seventh code means of enabling said function to notify said database server of said storage area identifying information.

11. A computer readable storage medium as claimed in claim 9, further comprising:

eighth code means of enabling plural processes, wherein said eighth process has a parallel database arrangement, and executes database processes in parallel and outputs processed LOB data to said common storage device in parallel.

12. A computer readable storage medium as claimed in claim 9, further comprising:

ninth code means of enabling said program to refer to said common storage device to which processed LOB data is output by said database server as the same node as a node where said database server is in operation to obtain said data.

\* \* \* \* \*